(12) United States Patent
Wakita

(10) Patent No.: US 12,173,113 B2
(45) Date of Patent: Dec. 24, 2024

(54) WATERBORNE EPOXY CURING AGENT

(71) Applicant: EVONIK OPERATIONS GMBH, Essen (DE)

(72) Inventor: Keiji Wakita, Chiba (JP)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/691,221

(22) Filed: Mar. 10, 2022

(65) Prior Publication Data

US 2022/0298296 A1 Sep. 22, 2022

Related U.S. Application Data

(60) Provisional application No. 63/162,292, filed on Mar. 17, 2021.

(51) Int. Cl.
| | |
|---|---|
| *C08G 59/50* | (2006.01) |
| *C08G 59/24* | (2006.01) |
| *C08G 59/42* | (2006.01) |
| *C08G 59/56* | (2006.01) |

(52) U.S. Cl.
CPC ......... *C08G 59/502* (2013.01); *C08G 59/245* (2013.01); *C08G 59/4269* (2013.01); *C08G 59/5033* (2013.01); *C08G 59/56* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 4,197,389 A | 4/1980 | Becker et al. | |
| 5,280,091 A | 1/1994 | Dubowik et al. | |
| 8,143,331 B2 | 3/2012 | Raymond et al. | |
| 2017/0247501 A1 | 8/2017 | Zheng et al. | |

FOREIGN PATENT DOCUMENTS

| | | |
|---|---|---|
| EP | 3170849 A1 | 5/2017 |
| WO | 2013003202 A1 | 1/2013 |

*Primary Examiner* — Megan McCulley
(74) *Attorney, Agent, or Firm* — Andrew H. Chung; Linda S. Li; Jason S. Ngui

(57) ABSTRACT

Provided is a waterborne epoxy curing agent comprising a reaction product of a) at least one amine having at least one moiety in the formula of -QNH—, wherein Q is a divalent hydrocarbon group, and wherein the amine has at least one tertiary amino group and at least one primary amino group per molecule; and b) at least one polyether polyol modified epoxide having one or more epoxide groups. Also provided is preparation methods thereof.

10 Claims, No Drawings

WATERBORNE EPOXY CURING AGENT

This Application claims the benefit of Application No. 63/162,292, filed on Mar. 17, 2021, the content of which is hereby incorporated by reference in its entirety into this application.

FIELD

The present disclosure relates to an epoxy curing agent, and particularly to a waterborne epoxy curing agent including the epoxy-amine adduct and preparation methods thereof.

BACKGROUND

Epoxy-amine curing systems are often used in coating. Those curing systems utilize epoxy resins and curing agents with amine chemistry. As environmental concerns become urgent, waterborne curing agents, which avoid use of volatile organic solvents, are desired.

U.S. Pat. No. 8,143,331 B2 teaches waterborne curing agents based on alkylated polyalkyleneamine (such as diethylenetriamine, triethylenetetramine) compounds and polyether polyol modified polyepoxide resins. The alkylation is realized through a reaction between the polyalkyleneamine and one or more aldehydes or ketones, followed by catalytic hydrogenation under presence of Pd/C catalyst.

Diethylenetriamine (DETA) is well known for usage as a curing agent for epoxy resins in epoxy adhesives and other thermosets, see WO 2013003202 A1. Recently, as disclosed in EP 3,170,849 B1, through reaction with formaldehyde, DETA is converted to a heterocyclic amine having two nitrogen atoms in the ring. This cyclic amine can significantly improve reactivity of epoxy system at low temperature. However, there are still critical issues at low application temperature such as blushing, slow thin film dry, and very poor water spot resistance. US 20170247501 A1 disclosed a waterborne curing composition obtained from the reaction of a polyether modified polyepoxide resin and a polyamine component.

Still, the market expects waterborne curing agents that could achieve fast curing rate while maintaining long pot life.

SUMMARY

One objective of the present disclosure is to provide an epoxy curing agent, which can realize fast curing and maintain long pot life when combined with epoxy resin.

This objective of the present disclosure is achieved by a waterborne epoxy curing agent comprising a reaction product of:
  a) at least one amine having at least one moiety in the formula of -QNH—, wherein Q is a divalent hydrocarbon group, and wherein the amine has at least one tertiary amino group and at least one primary amino group per molecule; and
  b) at least one polyether polyol modified epoxide having one or more epoxide groups.

Preferably, Q is —$CH_2CH_2$—, —$CH_2CH_2CH_2$—, —$CH_2CH(CH_3)$—, —$CH_2CH_2CH_2CH_2$—, —$CH_2CH_2CH(CH_3)$—, —$CH_2CH(CH_3)CH_2$—, —$CH(CH_3)CH(CH_3)$—, or —$CH_2CH(CH_2CH_3)$—.

Preferably, the amine includes one or more compounds represented by formula (I):

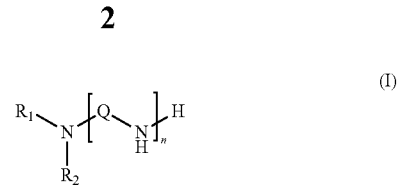

wherein n is an integer not less than 1, and wherein $R_1$ and $R_2$ are independently a substituted or unsubstituted C1 to C16 alkyl, alkenyl, alkadienyl, cycloalkyl, cycloalkenyl, cycloalkadienyl, aryl, or aralkyl group.

More preferably, the amine is N,N-dimethylaminopropylamine, N,N-diethylaminopropylamine, N,N-dipropylaminopropylamine, N,N-dibutylaminopropylamine, N,N-dimethyldipropylenetriamine, N,N-diethyldipropylenetriamine, $N^3$-[3-[(3-Aminopropyl)amino]propyl]-$N^1,N^1$-dimethyl-1,3-propanediamine, or a mixture thereof.

Preferably, the amine includes one or more compounds represented by formula (II):

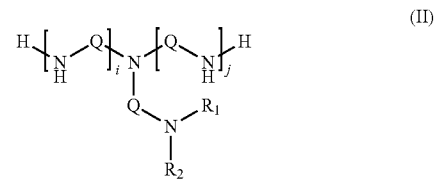

wherein i and j are independently integers not less than 1, and wherein $R_1$ and $R_2$ are independently a substituted or unsubstituted C1 to C16 alkyl, alkenyl, alkadienyl, cycloalkyl, cycloalkenyl, cycloalkadienyl, aryl, or aralkyl group.

Preferably, a stoichiometric ratio is in a range of 1 to 100, preferably 1.2 to 30, more preferably 1.5 to 10, wherein the stoichiometric ratio is a ratio of an equivalent number of active amine hydrogen atoms of the amine to an equivalent number of epoxide groups in the polyether polyol modified epoxide.

Preferably, the at least one polyether polyol modified polyepoxide resin comprises the reaction product of at least one polyepoxide compound and at least one polyether polyol.

Preferably, the polyether polyol is selected from polyethylene glycol, polypropylene glycol, or polybutylene glycol.

Preferably, the at least one polyepoxide compound is a diglycidyl ether of bisphenol A, a diglycidyl ether of bisphenol F, 1,4-butanediol diglycidyl ether, cyclohexane dimethylol diglycidyl ether, resorcinol diglycidyl ether, glycerol triglycidyl ether, trimethylol propane triglycidyl ether, or novolac epoxy resin.

Preferably, the waterborne epoxy curing agent further comprises water.

Preferably, Q is ethylene, propylene, or butylene.

Preferably, the waterborne epoxy curing agent further comprises one or more catalysts.

Preferably, the waterborne epoxy curing agent further comprises one or more additives selected from the group consisting of fillers, reinforcing agents, coupling agents, toughening agents, defoamers, dispersants, lubricants, colorants, marking materials, dyes, pigments, IR absorbers, UV absorbers, antistats, anti-blocking agents, nucleating agents, crystallization accelerators, crystallization delayers, conductivity additives, carbon black, graphite, carbon nanotubes, graphene, desiccants, de-molding agents, levelling auxiliaries, flame retardants, separating agents, optical lighteners, rheology additives, photochromic additives, softeners, adhesion promoters, anti-dripping agents, metallic pigments, stabilizers, metal glitters, metal coated particles, porosity inducers, glass fibers, nanoparticles, or flow assistants.

Another objective of the present disclosure is to provide a method for preparing a waterborne epoxy curing agent, comprising:
heating, to a temperature of 30° C. to 150° C. for 0.1 to 6 hours, an amine having at least one moiety in the formula of -QNH— and at least one polyether polyol modified epoxide having one or more epoxide groups;
wherein Q is a divalent hydrocarbon group and the amine has both at least one tertiary amino group and at least one primary amino group per molecule.

Preferably, a stoichiometric ratio of the amine to the epoxide is within a mole ratio of 1 to 100, preferably 1.2 to 30, more preferably 1.5 to 10.

DETAILED DESCRIPTION

The following description is used merely for illustration but is not to restrict the scope of the present disclosure.

The waterborne epoxy curing agent of the present disclosure comprises an epoxy-amine adduct, which is a reaction product of at least one amine and at least one polyether polyol modified epoxide.

An epoxy-amine adduct is a compound that is formed from a combination of a) one or more amines and b) one or more epoxides. The combination may be achieved through a chemical reaction, such as an addition reaction. When an excessive amount of amine reacts with insufficient epoxy resin and consumes nearly the entirety of the epoxide groups, an epoxy-amine adduct having amine hydrogen atoms of the residual amino groups is formed. Since the epoxy-amine adduct usually has a high molecular weight, it is less volatile and releases less amine odor. Through addition by a hydrophilic epoxide, the epoxy curing agent could have an enhanced hydrophilicity. In formulations, the epoxy curing agent could be diluted by water, avoiding use of expensive and volatile organic solvents.

Herein, two separate compounds that react to form the epoxy-amine adduct are (a) at least one amine having at least one moiety in the formula of -QNH—, wherein Q is a divalent hydrocarbon group having at least two carbon atoms, and wherein the amine has at least one tertiary amino group and at least one primary amino group per molecule, and (b) at least one polyether polyol modified epoxide.

Amine

According to one embodiment of the present disclosure, the amine has at least one moiety in the formula of -QNH—. Q is a divalent hydrocarbon group. The amine has both at least one tertiary amino group and at least one primary amino group per molecule.

Preferably, Q is selected from —CH$_2$CH$_2$—, —CH$_2$CH$_2$CH$_2$—, —CH$_2$CH(CH$_3$)—, —CH$_2$CH$_2$CH$_2$CH$_2$—, —CH$_2$CH$_2$CH(CH$_3$)—, —CH$_2$CH(CH$_3$)CH$_2$—, —CH(CH$_3$)CH(CH$_3$)—, or —CH$_2$CH(CH$_2$CH$_3$)—.

Preferably, the amine includes one or more compounds represented by formula (I):

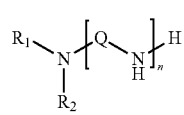

(I)

wherein n is an integer equal to or larger than 1, and wherein R$_1$ and R$_2$ are independently a substituted or unsubstituted C1 to C16 alkyl, alkenyl, alkadienyl, cycloalkyl, cycloalkenyl, cycloalkadienyl, aryl, or aralkyl group.

More preferably, the groups R$_1$ and R$_2$ are independently selected from methyl, ethyl, n-propyl, isopropyl, n-butyl, sec-butyl, isobutyl, or tert-butyl.

Still more preferably, the amine is N,N-dimethylaminopropylamine (DMAPA), N,N-diethylaminopropylamine (DEAPA), N,N-dipropylaminopropylamine, N,N-dibutylaminopropylamine, N,N-dimethyldipropylenetriamine (DMAPAPA), N,N-diethyldipropylenetriamine, N$^3$-[3-[(3-Aminopropyl)amino]propyl]-N$^1$,N$^1$-dimethyl-1,3-propanediamine, or a mixture thereof.

Preferably, the amine includes one or more compounds represented by formula (II):

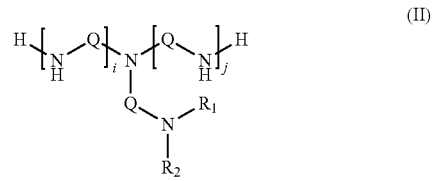

(II)

wherein i and j are independently integers equal to or larger than 1, and wherein R$_1$ and R$_2$ are independently a substituted or unsubstituted C1 to C16 alkyl, alkenyl, alkadienyl, cycloalkyl, cycloalkenyl, cycloalkadienyl, aryl, or aralkyl group.

The benefits brought by using such amines include, a flexible backbone, a tertiary amino (e.g., dimethylamino or diethylamino) group capable of serving as basic catalyst during crosslinking reaction, and an active reactant played by the primary and secondary amino groups.

It is surprisingly found that the catalytic function of tertiary amino group, although important in accelerating the crosslinking reaction when the curing agent is mixed with epoxy resin, does not significantly reduce the pot life of the mixture of curing agent and epoxy resin.

Epoxide-Amine Adduct

According to the present disclosure, the above-mentioned amine is reacted with one or more epoxides to form an epoxide-amine adduct. In the reaction, the number of the primary amino groups in the amine will be reduced by its reaction with epoxide groups in the epoxide. Reduction of the number of primary amino groups help to increase the pot life.

The adduct could be formed in an addition reaction involving amine and epoxide. The amine is first heated and then a liquid or solid epoxide is added dropwise. The system is left to have the reaction completed and the resultant is diluted with deionized water to form an aqueous solution of the curing agent. The epoxy addition reaction carried out for forming the adduct according to the present disclosure is carried out at 30 to 180° C., preferably 60 to 120° C., for some minutes to several hours. The reaction is carried out in the absence of water or in an aqueous solution. If no water is present in the reaction medium, water could be added into the resultant after the reaction. The amount of water to be added into the resultant could depend on the desired solid content or viscosity of the final curing agent.

To obtain an epoxy-amine adduct having a fast curing speed and a long pot life when it is used as a curing agent for epoxy resins, the stoichiometric ratio between the amine hydrogens and epoxide groups is preferably within a range of 1 to 100, calculated as a ratio of an equivalent number of amine hydrogen atoms in the amine to an equivalent number of epoxide groups in the epoxides.

Polyether Polyol Modified Epoxide

According to the present disclosure, the epoxy-amine adduct is formed by reacting the amine component with a polyether polyol modified epoxide. The polyether polyol modified epoxide preferably includes at least one monofunctional or multifunctional epoxide. The polyether polyol modified epoxide could be synthesized by reacting one or more multifunctional epoxides with one or more polyether polyols. The polyether polyol modification of the epoxide increases hydrophilicity. Details of polyether polyol will be given hereinafter.

The at least one monofunctional epoxide includes one or more epoxides or epoxy resins having one epoxide group per molecule. The at least one multifunctional epoxide includes, but is not limited to, epoxides having two, three, four, or at least five epoxide groups per molecule.

Useful compounds are a multitude of those known for this purpose that contain more than one epoxide group, preferably two epoxide groups, per molecule. These epoxide compounds are preferably either saturated or unsaturated. They are preferably aliphatic, cycloaliphatic, aromatic or heterocyclic, and have hydroxyl groups. They preferably contain such substituents that do not cause any side reactions under the mixing or reaction conditions, for example alkyl or aryl substituents, ether moieties and the like. They are preferably glycidyl ethers which derive from polyhydric phenols, especially bisphenols and novolac, and which have molar masses based on the number of epoxide groups (EEW, "epoxide equivalent weights", "EV value") between 100 and 1500 g/eq, but especially between 150 and 250 g/eq.

Examples of polyhydric phenols include: resorcinol, hydroquinone, 2,2-bis(4-hydroxyphenyl)propane (bisphenol A), bis(4-glycidyloxyphenyl)methane (bisphenol E), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxide equivalent weight of 150 to 200 g/eq. It is also possible to use polyglycidyl ethers of polyols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

The monofunctional epoxide includes, but is not limited to, an epoxidized unsaturated hydrocarbon such as ethylene, propylene, butylene, cyclohexene, and styrene oxides, and the like; halogen-containing epoxides such as epichlorohydrin; epoxy-ethers of monohydric alcohols such as methyl, ethyl, butyl, 2-ethylhexyl, dodecyl alcohol, and the like; epoxy-ethers of monohydric phenols such as phenol, cresol, and other phenols substituted in the ortho or para positions; glycidyl esters of saturated or unsaturated carboxylic acids; epoxidized esters of unsaturated alcohols or unsaturated carboxylic acids; acetals of glycidaldehyde; or combination thereof. Preferably, the monofunctional glycidyl ether includes o-cresyl glycidyl ether, phenyl glycidyl ether, p-tert-butylphenyl glycidyl ether, n-butyl glycidyl ether, 2-ethyl hexyl glycidyl ether, any alkyl $C_8$ to $C_{14}$ glycidyl ether, or any combination thereof.

The multifunctional epoxide includes, but is not limited to a bisphenol A diglycidyl ether, bisphenol E diglycidyl ether, bisphenol F diglycidyl ether, 1,4-butanediol diglycidyl ether, cyclohexane dimethylol diglycidyl ether, resorcinol diglycidyl ether, glycerol triglycidyl ether, trimethylol propane triglycidyl ether, novolac epoxy resin, any other aliphatic diglycidyl or triglycidyl ether, any other cycloaliphatic diglycidyl or triglycidyl ether, or any combination thereof. Preferably, the multifunctional epoxide is a bisphenol A epoxy resin, a bisphenol F epoxy resin, 1,4-butanediol diglycidyl ether, cyclohexane dimethylol diglycidyl ether, resorcinol diglycidyl ether, glycerol triglycidyl ether, trimethylol propane triglycidyl ether, or novolac epoxy resin, or a combination thereof.

Polyether Polyol

Polyether polyol according to the present disclosure is represented by formula (III):

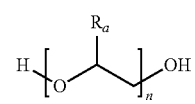

(III)

where n is an integer not less than 1, and $R_a$ refers to a monovalent radical, including hydrogen, methyl, ethyl, or any other alkyl. The polyether polyol includes, but are not limited to, polyethylene glycol, polypropylene glycol, polybutylene glycol, or any other polyether polyol.

Suitable polyether polyols are described in U.S. Pat. No. 4,197,389, starting on column 5, line 53, and continuing to column 6, line 20. Non-limiting examples of polyether polyols that are useful in the present invention include polyethylene glycols, polypropylene glycols, or combinations thereof. Mixtures of different molecular weight polyether polyols can be used, as well as mixtures of different polyether polyols. The combinations of the different polyether polyols can be mixed first and then reacted with the at least one polyepoxide compound, or can be reacted separately with the at least one polyepoxide compound and subsequently mixed or blended. Generally, polyether polyols with number average molecular weights in the range from about 200 to 10,000 g/mol, from about 400 to about 8,000 g/mol, from about 600 to about 5,000 g/mol, or from about 800 to about 2,500 g/mol, are useful in the present disclosure.

The modification could be realized through a reaction between the polyether polyol and epoxide under a heating condition. The reaction optionally can be accelerated by suitable catalysts, for example, $BF_3$-amine catalyst. The reaction condition could be in accordance with the process described in U.S. Pat. No. 4,197,389.

To produce polyether polyol modified poly epoxide resins useful in the present invention, the reactant ratio of epoxide groups in the at least one polyepoxide compound to the hydroxyl groups in the at least one polyether polyol is generally within a range from about 1.5:1 to about 8:1. The reactant ratio, in accordance with another aspect of the present disclosure, is about 1.6:1, about 2:1, about 2.5:1, about 3:1, about 3.5:1, about 4:1, about 4.5:1, about 5:1, about 5.5:1, about 6:1, about 6.5:1, about 7:1, or about 7.5:1. In yet another aspect, the reactant ratio is in a range from about 1.8:1 to about 6:1. In a further aspect, the reactant ratio of epoxide groups in the at least one polyepoxide compound to the hydroxyl groups in the at least one polyether polyol is in a range from about 2:1 to about 4:1.

Synthesis of Epoxy-Amine Adduct

The addition reaction to synthesize the epoxy-amine adduct according to the present disclosure comprises contacting amine with epoxide, optionally with presence of a plasticizer. Details of the plasticizer will be discussed hereinafter.

Preferably, the reaction of amine with epoxide proceeds at a reaction temperature of about 50° C. to about 150° C., more preferably about 60° C. to about 140° C., still more preferably about 60° C. to about 90° C. The heating condition endures for 0.1 to 10 hours, preferably 0.3 to 2 hours. Preferably, the heating condition is accompanied by a rigorous stirring, for example, under 100 rounds per minute (RPM), 150 RPM, or 200 RPM stirring.

The reaction is preferably conducted under a protective atmosphere, more preferably in a nitrogen or argon atmosphere, partly to keep amine from oxidation or other threats.

The synthesis is optionally conducted with presence of a solvent or plasticizer. Preferred solvent or plasticizer for the reaction includes but is not limited to, water, acetonitrile, alcohol such as methanol, ethanol, n-propanol, i-propanol, n-butanol, Dowanol™ PM, t-butanol, i-butanol, and benzyl alcohol, and hydrocarbons such as toluene, xylene, hexane, and heptane. More preferred reaction solvent or plasticizer includes water, methanol, ethanol, n-propanol, i-propanol, n-butanol, Dowanol™ PM and benzyl alcohol. The solvent is preferably removed after the reaction is complete or remain mixed with the epoxy-amine adduct. For example, after the reaction of epoxide and amine, benzyl alcohol remains as a plasticizer.

Stoichiometric Ratio

Herein, stoichiometric ratio is calculated as a ratio of an equivalent number of amine hydrogen atoms in the amine to an equivalent number of epoxide groups in the epoxides. It can be calculated according to equation (A):

$$SR = \frac{n_a}{n_e} = \frac{M_a}{AHEW} \frac{EEW}{M_e} \quad (A)$$

Wherein SR is the calculated stoichiometric ratio, $n_a$ is the number of amine hydrogen atoms, $n_e$ is the number of epoxide groups, $M_a$ is the mass weight of amine, and $M_e$ is the mass weight of epoxide. AHEW is amine hydrogen equivalent weight in g/mol. Epoxide group content, indicated by epoxide equivalent weight or EEW, is the ratio between the molecular weight of the monomer and the number of epoxide groups.

To prepare the epoxy-amine adduct according to the present disclosure, a stoichiometric ratio is preferably in a range of 1-100, more preferably in a range of 1.2-30, more preferably in a range of 1.5-10.

This stoichiometric ratio causes the epoxy-amine adduct to possess a number of unreacted hydrogen atoms bonded to nitrogen atoms, reducing the reactivity of epoxy-amine adduct when being mixed with epoxy resin. When the stoichiometric ratio of amine hydrogen to epoxide is too high, e.g., more than 100, the resultant epoxy-amine adduct will suffer from a low molecular weight and a number of primary amino groups in the amine would be left. The resultant epoxy-amine adduct might have a high reactivity towards epoxy resins, causing a low surface quality of the final coating. When the stoichiometric ratio of amine hydrogen to epoxide is too low, e.g., less than 1.2, there might be a high degree of crosslinking and the molecular weight of epoxy-amine adduct might become very high. The epoxy-amine adduct may suffer from high viscosity caused by high level of crosslinking and thus would be unsuitable for usage as a curing agent.

Curing Agent

The epoxy-amine adduct could be used in a waterborne curing agent for epoxy resins. Besides the epoxy-amine adduct, the waterborne curing agent could include one or more components. Details regarding the components are described hereinafter.

Besides the epoxy-amine adduct, the waterborne curing agent can further comprise at least one multifunctional amine. Multifunctional amine, as used herein, describes compounds with amine functionality and which contain two (2) or more amine hydrogen atoms.

Non-limiting examples of multifunctional amines that are within the scope of the present disclosure include, but are not limited to, an aliphatic amine, a cycloaliphatic amine, an aromatic amine; a Mannich base derivative of an aliphatic amine, a cycloaliphatic amine, or an aromatic amine; a polyamide derivative of an aliphatic amine, a cycloaliphatic amine, or an aromatic amine; an amidoamine derivative of an aliphatic amine, a cycloaliphatic amine, or an aromatic amine; an amine adduct derivative of an aliphatic amine, a cycloaliphatic amine, or an aromatic amine, and the like, or any combination thereof.

Preferably, more than one multifunctional amine is used in the compositions of the present disclosure. For example, the at least one multifunctional amine comprises an aliphatic amine and a Mannich base derivative of a cycloaliphatic amine. Also, the at least one multifunctional amine comprises one aliphatic amine and one different aliphatic amine.

Exemplary aliphatic amines include polyethyleneamines (ethylene diamine or EDA, diethylene triamine or DETA, triethylenetetraamine or TETA, tetraethylenepentamine or TEPA, pentaethylenehexamine or PEHA, and the like), polypropyleneamines, aminopropylated ethylenediamines, aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine (commercially available as Dytek-A), and the like, or combinations thereof. Additionally, the poly(alkylene oxide) diamines and poly(alkylene oxide) triamines commercially available under the Jeffamine name from Huntsman Corporation, are useful in the present disclosure. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine (IPDA), various isomers or norbornane diamine, 3,3'-dimethyl-4,4'-diaminodicyclohexyl methane, 4,4'-diaminodicyclohexyl methane, 2,4'-diaminodicyclohexyl methane, benzylated ethylene diamine, a mixture of methylene bridged poly(cyclohexyl-aromatic)amines, and the like, or combinations thereof. The mixture of methylene bridged poly(cyclohexyl-aromatic)amines is abbreviated as either MBP-CAA or MPCA, and is described in U.S. Pat. No. 5,280,091, which is incorporated herein by reference in its entirety. According to some embodiments of the present disclosure, the at least one multifunctional amine is a reaction product of 1,3-benzenedimethanamine and epichlorohydrin (commercially available from Mitsubishi Gas Chemical Company as Gaskamine 328).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present disclosure is cardanol, which is obtained from cashew nut shell liquid.

Alternatively, Mannich bases can be prepared by an exchange reaction of a multifunctional amine with a tertiary amine containing a Mannich base, such as tris(dimethylaminomethyl)phenol (commercially available as Ancamine® K54 from Evonik Operations GmbH) or bis(dimethylaminomethyl)phenol.

Polyamide derivatives can be prepared by the reaction of an aliphatic amine, cycloaliphatic amine, or aromatic amine with a dimer fatty acid, or mixtures of a dimer fatty acid and a fatty acid. Amidoamine derivatives can be prepared by the reaction of an aliphatic amine, cycloaliphatic amine, or aromatic amine with fatty acids.

Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

In another aspect of the present disclosure, the waterborne curing agent includes a co-curing agent. The co-curing agent may be an amidoamine curing agent, an aliphatic curing agent, a polyamide curing agent, a cycloaliphatic curing agent, or a Mannich base curing agent which also includes phenalkamine.

In some aspects of the present disclosure, a plasticizer is added to the waterborne curing agent. Preferably, the plasticizer is water. Addition of water into the adduct could help to adjust the viscosity and reduce the solid content of the system.

Preferably, a curing accelerator could be added into the waterborne curing agent composition for speeding up the curing process when the waterborne curing agent is mixed with epoxy resin. The curing accelerator include one or more selected from tris(dimethylaminomethyl) phenol, benzyl dimethylamine, various isomers of nonyl phenol, triethanolamine, or N-(3-aminopropyl) iminodiethanol.

Other additives or ingredients could be present in the system depending on the end application or environment to which the system is used.

Epoxy Resin in Coating Composition

The epoxy-amine adduct of the present disclosure could be used with epoxy resins already known in the art, to form a coating composition. The epoxy resins are the same with or different from the epoxide used in synthesis of epoxy-amine adduct. Preferably, the epoxy resins could be essentially free of polyether polyol modification.

Useful compounds are a multitude of those known for this purpose that contain more than one epoxide group, preferably two epoxide groups, per molecule. These epoxide compounds are preferably either saturated or unsaturated. They are preferably aliphatic, cycloaliphatic, aromatic or heterocyclic, and have hydroxyl groups. They preferably contain such substituents that do not cause any side reactions under the mixing or reaction conditions, for example alkyl or aryl substituents, ether moieties and the like. They are preferably glycidyl ethers which derive from polyhydric phenols, especially bisphenols and novolac, and which have molar masses based on the number of epoxide groups ("epoxide equivalent weights", "EV value") between 100 and 1500 g/eq, but especially between 150 and 250 g/eq.

Examples of polyhydric phenols include: resorcinol, hydroquinone, 2,2-bis(4-hydroxyphenyl)propane (bisphenol A), bis(4-glycidyloxyphenyl)methane (bisphenol E), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis (4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis (4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxide equivalent weight of 150 to 200 g/eq. It is also possible to use polyglycidyl ethers of polyols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful component includes: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxide compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention should additionally be made of glycidyl esters of saturated or unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions of up to 30% by weight, preferably 10% to 20% by weight, based on the mass of the polyglycidyl ethers.

Useful epoxide compounds preferably include glycidyl ethers and glycidyl esters, aliphatic epoxides, diglycidyl ethers based on bisphenol A, bisphenol E and/or bisphenol F, and glycidyl methacrylates. Other examples of such epoxides are triglycidyl isocyanurate (TGIC, trade name: ARALDITE 810, Huntsman), mixtures of diglycidyl terephthalate and triglycidyl trimellitate (trade name: ARALDITE PT 910 and 912, Huntsman), glycidyl esters of versatic acid (trade name: CARDURA E10, Shell), 3,4-epoxycyclohexylmethyl 3,4'-epoxycyclohexanecarboxylate (ECC), ethylhexyl glycidyl ether, butyl glycidyl ether, and pentaerythrityl tetraglycidyl ether. It is also possible to use mixtures of the epoxide compounds mentioned.

Particularly preferred epoxide components are polyepoxides based on bisphenol A diglycidyl ether, bisphenol E diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether and diglycidyl hexahydrophthalate.

According to the present disclosure, it is also possible with preference to use mixtures of the above-mentioned epoxide compounds in the epoxy resin.

The epoxy resin may be in various forms, such as, a crystalline form, a powdered form, a semi-solid form, a liquid form, etc. For the liquid form, the epoxy resin may be dissolved or dispersed in a solvent, for example, water. The epoxy resin may be in an aqueous emulsion or dispersion of varying concentrations. Preferably, the epoxy resin is in a liquid form, to facilitate the mixing process.

Ingredients in Coating Composition

The present disclosure further provides a coating composition comprising the epoxy-amine adduct and at least one epoxy resin.

To bring in more functionality or features to satisfy industrial requirements, the coating composition preferably includes additives. Additives are understood to mean substances which are added to alter the properties of the coating composition in the desired direction, for example to match viscosity, wetting characteristics, stability, reaction rate, blister formation, storability or adhesion, and use properties, to the end application. Several additives are described, for example, in WO 99/55772, pp. 15-25.

Preferred additives are selected from the group consisting of fillers, reinforcing agents, coupling agents, toughening agents, defoamers, dispersants, lubricants, colorants, marking materials, dyes, pigments, IR absorbers, UV absorbers, antistats, anti-blocking agents, nucleating agents, crystallization accelerators, crystallization delayers, conductivity additives, carbon black, graphite, carbon nanotubes, graphene, desiccants, de-molding agents, levelling auxiliaries, flame retardants, separating agents, optical lighteners, rheology additives, photochromic additives, softeners, adhesion promoters, anti-dripping agents, metallic pigments, stabilizers, metal glitters, metal coated particles, porosity inducers, glass fibers, nanoparticles, flow assistants, or combinations thereof.

The additive preferably constitutes a proportion of not greater than 90 wt. %, preferably not greater than 70 wt. %, more preferably not greater than 50 wt. %, still more preferably not greater than 30 wt. %, with respect to the total weight of coating composition.

For example, it is advantageous to add light stabilizers, for example sterically hindered amines, or other auxiliaries as described, for example, in a total amount of 0.05% to 5% by weight.

To produce the curing compositions of the present disclosure, it is additionally possible to add additives such as levelling agents, for example silicones, or adhesion promoters, for example those based on acrylate. In addition, still further components may optionally be present. Auxiliaries and additives used in addition may be chain transfer agents, plasticizers, stabilizers and/or inhibitors.

In some cases, the coating composition preferably includes an antioxidant additive. The antioxidant might include one or more of the structural units selected from sterically hindered phenols, sulfides, or benzoates. Here, in sterically hindered phenols, the two ortho-hydrogen atoms are substituted by compounds which are not hydrogen and preferably carry at least 1 to 20, particularly preferably 3 to 15, carbon atoms and are preferably branched. Benzoates also carry, preferably in the ortho position relative to the OH group, substituents which are not hydrogen and carry particularly preferably 1 to 20, more preferably, 3 to 15, carbon atoms, which are preferably branched.

In still another embodiment, if needed, one or more catalysts are preferably introduced to the coating composition, preferably as a part of the coating composition, to promote the reaction of the epoxide groups of epoxy resins and amine groups of the coating composition. Useful catalysts that may be introduced to the coating composition include Ancamine® products available from Evonik Operations GmbH and products marketed as "Accelerators" available from Huntsman Corporation. Exemplary catalysts are Ancamine® K54 from Evonik Operations GmbH and piperazine-base Accelerator® 399 available from Huntsman Corporation. When utilized, such catalysts preferably comprise between 0 and about 10 percent by weight of the total adhesive composition.

Preferably, the coating composition according to the present disclosure consists of the above specified components.

The present disclosure also is directed to articles of manufacture comprising the compositions disclosed herein. For example, an article can comprise a coating composition which comprises the reaction product of an epoxy-amine adduct and an epoxy resin. Articles of manufacture produced from coating compositions disclosed herein include, but are not limited to, adhesives, coatings, primers, sealants, curing compounds, construction products, flooring products, and composite products. Further, such coatings, primers, sealants, or curing compounds can be applied to metal or cementitious substrates. Coatings based on these coating compositions can be solvent-free or can contain diluents, such as water or organic solvents, as needed for the particular application. Coatings can contain various types and levels of pigments for use in paint and primer applications. Coating compositions comprise a layer having a thickness ranging from 40 to 400 μm (micrometer), preferably 80 to 300 μm, more preferably 100 to 250 μm, for use in a protective coating applied on to metal substrates. In addition, for use in a flooring product or a construction product, coating compositions comprise a layer having a thickness ranging from 50 to 10,000 μm, depending on the type of product and the required end-properties. A coating product that delivers limited mechanical and chemical resistances comprises a layer having a thickness ranging from 50 to 500 μm, preferably 100 to 300 μm; whereas a coating product such as, for example, a self-levelling floor that delivers high mechanical and chemical resistances comprises a layer having a thickness ranging from 1,000 to 10,000 μm, preferably 1,500 to 5,000 μm.

Numerous substrates are suitable for the application of coatings of the present disclosure with proper surface preparation, as is well known to one of ordinary skill in the art. Such substrates include, but are not limited to, concrete and various types of metals and alloys, such as steel and aluminium. Coatings of the present disclosure are suitable for the painting or coating of large metal objects or cementitious substrates including ships, bridges, industrial plants and equipment, and floors.

Coatings of the present disclosure can be applied by any number of techniques including spray, brush, roller, paint mitt, and the like. In order to apply very high solids content or 100% solids coatings of the present disclosure, plural component spray application equipment can be used, in which the amine and epoxide components are mixed in the lines leading to the spray gun, in the spray gun itself, or by mixing the two components together as they leave the spray gun. Using this technique can alleviate limitations regarding the pot life of the formulation, which typically decreases as both the amine reactivity and the solids content increases. Heated plural component equipment can be employed to reduce the viscosity of the components, thereby improving ease of application.

Construction and flooring applications include compositions comprising the coating compositions of the present disclosure in combination with concrete or other materials commonly used in the construction industry. Applications of compositions of the present disclosure include, but are not limited to composition's use as a primer, a deep penetrating primer, a coating, a curing compound, and/or a sealant for new or old concrete, such as referenced in ASTM C309-97, which is incorporated herein by reference. As a primer or a sealant, the coating compositions of the present disclosure can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Coating compositions of the present disclosure can be mixed with cementitious materials such as concrete mix to form polymer or modified cements, tile grouts, and the like.

The present disclosure is illustrated by way of example and comparative examples hereinbelow.

EXAMPLES

In the following examples, the materials or definitions used are listed as below.

D.E.R.™ 331 is diglycidyl ether of bisphenol A, from Olin Corporation, a liquid reaction product of epichlorohydrin and bisphenol A. D.E.R.™ 331 has an EEW of 182-192 g/mol.

Epon® 828 epoxy resin is commercially available from Hexion Specialty Chemicals, Inc and has a number average molecular weight of about 400 and an epoxy equivalent weight of about 185-192.

Dimethylaminopropylamine and N,N-dimethyldipropylenetriamine are commercially purchased from Solvay S.A.

Ancamine® 2655 curing agent obtained from Evonik Operations GmbH is an aliphatic amine (N,N'-bis(3-aminopropyl)ethylenediamine) with an AHEW of about 29 g/Eq.

Benzylated amine herein is a benzylated product of mixture of diethylenetriamine (DETA) and triethylenetetramine (TETA). It has an AHEW of about 58 g/Eq.

Gaskamine® 328 from Mitsubishi Gas Chemical Co., Inc. is a modified polyamine hardener with excellent chemical resistance, wet surface adhesion and fast cure properties. It is a reaction product of 1,3-benzenedimethanamine with epichlorohydrin. It has an AHEW of about 55 g/Eq.

Polyalkylene polyamines such as diethylenetriamine (DETA), triethylenetetramine (TETA), and tetraethylenepentamine (TEPA) can be commercially available from various manufacturers.

M-xylylenediamine (MXDA) has an AHEW of 34 g/Eq.

Hardener OH-802 (benzylated EDA) made from EDA and benzyl chloride is from PTI Japan Co., Ltd. It has an AHEW of 61 g/Eq.

Ancamine® K54 (hereinafter K54 for short) is tris-(dimethylaminomethyl) phenol from Evonik Operations GmbH. It is a Lewis Base catalyst for curing liquid epoxy resins.

Cresyl glycidyl ethers (hereinafter CGE for short) from Evonik Operations GmbH as Epodil® 742 is a reactive diluent used to reduce the viscosity of epoxy resin systems. CGE has an EEW of about 181 g/Eq.

Grilonit V34-4/5 is an epoxy-functional emulsifier with average molecular weight of about 1,000 g/mol and an EEW of about 365 g/Eq. It is a propoxylated epoxy resin blended with DGEBA.

Sebacic acid from Sigma Aldrich is used as co-curing agent for epoxy systems.

Amine hydrogen equivalent weight in g/mol, or AHEW, is calculated as molecular weight of the amine divided by the number of amine hydrogen atoms per molecule.

Epoxide group content, indicated by epoxide equivalent weight or EEW, is the ratio between the molecular weight of the epoxide and the number of epoxide groups.

Stoichiometric ratio is calculated as a ratio of an equivalent number of active amine hydrogen atoms in the amine to an equivalent number of epoxide groups in the epoxides. It can be calculated according to equation (A) when there is only one kind of amine and one kind of epoxide:

$$SR = \frac{n_a}{n_e} = \frac{M_a}{AHEW} \frac{EEW}{M_e} \quad (A)$$

SR is the calculated stoichiometric ratio, $n_a$ is the number of amine hydrogen atoms, $n_e$ is the number of epoxide groups, $M_a$ is the mass weight of amine, and $M_e$ is the mass weight of epoxide.

When there are two or more kinds of amines and/or epoxides, $n_a$ is a sum of numbers of amine hydrogen atoms for each kind of amine, $n_e$ is a sum of numbers of epoxide groups for each kind of epoxide.

Curing agent use level is dosage of curing agent per hundred resin (phr). In the synthesis examples it is calculated as amount of epoxy-amine adducts per diluted epoxy resin having an EEW of 195 g/mol.

The following protocols to test physical performance or properties of sample are used:

Viscosity was measured by a Brookfield DV-II+ Pro viscometer at 25° C. Tensile strength and elongation were measured according to ISO 527-2. Glass transition temperature was tested using DSC according to ASTM E1356-08. Thin film set time (TFST) was measured using a Beck-Koller Drying Recorder, in accordance with ASTM D5895.

Pot life was measured using a glossiness-based evaluation. As waterborne curing agent usually has a low viscosity and the change of viscosity with time is also normally difficult to observe, it provides a better assessment of pot life by evaluating the glossiness of waterborne curing agent in the form of a thin film coating. After epoxy resin and a curing agent were mixed, the resulting formulation was kept for certain time (0 mins, 10 mins, 20 mins, 30 mins, or 60 mins) and then applied at 150 μm thickness. Film appearance was rated visually after 1 day.

Glossiness was evaluated using a reference scale, in which poor surface was assigned with "1" and the mirror-like surface was assigned with "5".

Curing speed was measured using a specially designed device with a sharp needle scratching a thin film coating prepared from the waterborne curing agent and epoxy resin in a predefined mixing ratio in various time period after the coating was prepared. When measuring the curing speed, the coating film, on the top of a carrier, processes beneath the device and had its surface contacted with the tip of the needle. A scratch then was formed for uncured coating. By observing the appearance of the scratch, a curing phase, or so-called "stage" was given.

Surface hardness was tested with both a pencil hardness test using a pencil hardness tester, and a pendulum hardness test based on the damping of pendulum's oscillation in relation to the softness of the tested coating surface. Pencils of 6B to 9H hardness-grade (6B, 5B, 4B, 3B, 2B, B, HB, F, H, 2H, 3H, 4H, 5H, 6H, 7H, 8H, 9H) were used. The pencil was moved scratching over the surface under a 45° angle with a constant pressure. An optical assessment was carried out to see with which hardness level the pencil damaged the surface. The coating films were deposited in an environment with a constant temperature of 25° C. and a relative humidity of 50%. The samples had their surface hardness tested in 1, 3, and 7 days after their preparation.

Synthesis of Polyether Polyol Modified Polyepoxide
Polyether Polyol Modified Polyepoxide (Epoxide A)

379 g of polyethylene glycol 1000 (0.758 equivalents OH) and 490 g of a bisphenol-A diglycidyl ether having an epoxy equivalent weight of 190 g/Eq (2.58 equivalents epoxy) were charged to a stirred reactor equipped with a thermocouple and a reflux condenser. The ratio of epoxy groups or epoxy equivalents in the polyepoxide compound to hydroxyl groups in the polyol was 3.4:1. 3 grams of a BF-amine catalyst, commercially available from Evonik Operations GmbH, as Anchor® 1040, were then added to the reactor. While the reactor contents were stirred, the reactor temperature was increased to 170° C. This temperature was maintained until the epoxy equivalent weight increased to about 475 to 500 g/Eq. The reactor contents were then cooled, resulting in a reaction product designated as epoxide A. Its epoxy equivalent weight was 498 g/Eq and the viscosity at 40° C. was 33 Poise (3.3 Pa s).

Polyether Polyol Modified Polyepoxide (Epoxide B)

Polyether polyol modified polyepoxide B was synthesized according to the same process as described for synthesizing polyether polyol modified polyepoxide A. The reactants were 3,043.8 g of polyethylene glycol 2000 (3.04 equivalents OH) and 1,144.6 g of a bisphenol-A diglycidyl ether having an epoxy equivalent weight of 190 g/Eq (6.09 equivalents epoxy). The ratio of epoxy groups or epoxy equivalents in the polyepoxide compound to hydroxyl groups in the polyol was 2:1. After the process of synthesizing polyether polyol modified epoxide, the final product was designated as epoxide B. The epoxy equivalent weight was 1,392 g/Eq and the viscosity at 70° C. was 668 mPa s. Viscosity was determined using a Brookfield DV-II+ cone and plate viscometer, CP52 spindle, 100 RPM. Using gel chromatography (GPC), THF solvent, and polystyrene calibration standards, the $M_n$ (number-average molecular weight) was 4017 g/mol, and the $M_w$ (weight average molecular weight) was 7,866 g/mol. Low molecular weight unreacted epoxy resin was excluded from molecular weight distribution and from the determination of $M_n$ and $M_w$.

Synthesis of Benzylated Amine at a 1.1:1 Molar Ratio 210 g of DETA 2.0 moles), 90 g of TETA (0.62 moles) and 4.5 g of Pd/C catalyst were placed in a 1-liter autoclave batch reactor. The reactor was sealed and subsequently purged with nitrogen and then with hydrogen to remove any air from the reactor. Over a time period of about 15 to 20 minutes, 338 g of benzaldehyde (3.2 moles) were added to the reactor. After the addition of the benzaldehyde was complete, the reactor contents were stirred for an additional 15 minutes or until the reaction was complete, at which time the reaction exotherm began to subside. At this point, the reactor was pressurized to 120 psi with hydrogen and the reactor was heated to 80° C. When the rate of hydrogen uptake slowed, the pressure was increased to 800 psi and the temperature was increased to 120° C. The hydrogenation process continued until the rate of hydrogen uptake fell below 0.0034 MPa/min (0.5 psi/min). The total hydrogenation time was about 5 hours. The reactor was cooled to 60° C. and depressurized, and the reaction product was filtered to remove the catalyst. Water was removed using a rotary evaporator operating under 20 mm Hg vacuum and temperatures up to 120° C. The resulting reaction product was benzylated amine, with viscosity of 40 mPa·s, AHEW of about 54 g/Eq, theoretical amine value of 830, and actual (measured) amine value of 794.

Synthesis of Epoxy-Amine Adduct

Synthesis Example (SE) 1

DMAPA (22.15 g, 0.2168 mol, AHEW=51 g/Eq) and DMAPAPA (29.53 g, 0.1854 mol, AHEW=53 g/Eq) were loaded into a 500 mL flask. The mixture was stirred and heated to 80-95° C., and 23.74 g of epoxide B (EEW=1392 g/Eq) was added dropwise. After the addition, 97.98 g of epoxide A (EEW=498 g/Eq) was added dropwise. The reaction was left to proceed for 1 hour. Benzylated ethylene diamine (22.09 g) and 2,4,6-tris(dimethylaminomethyl)phenol (3.75 g, as a curing accelerator) were added and the mixture was cooled. As the last step, the mixture was diluted with deionized water (200.75 g) to obtain an aqueous solution which is suitable as a waterborne curing agent. The solid content of epoxy-amine adduct is 50 wt. %.

The product was obtained as a clear liquid in quantitative yield with an amine value of 150 mEq KOH/g and a viscosity of 599 mPa·s at 25° C. Calculated amine hydrogen equivalent weight is 350.7 g/Eq.

SE 2

SE 2 utilized the same process as described in SE 1. The stoichiometric ratio, ANEW, and solid content are shown in Table 1.

Table 1 showed amounts of raw materials for preparing synthesis examples and comparative synthesis examples (CSEs). Measured amine hydrogen equivalent weights, stoichiometric ratios, viscosity, and solid contents were also listed in the end.

CSE 1 had a viscosity at 25° C. of about 25,000 to 45,000 mPa s. CSE 3 showed a gelly appearance, which is hard to test the viscosity. SE 1 and SE 2 both showed a much lower viscosity than any of the CSEs.

TABLE 1

| | SE 1 | SE 2 | CSE 1 | CSE 2 |
|---|---|---|---|---|
| Amine | | | | |
| DMAPA (g) | 22.15 | 15.52 | — | — |
| DMAPAPA (g) | 29.53 | 20.69 | — | — |
| Ancamine ® 2655 (g) | — | — | — | 16.15 |
| Benzylated amine (g) | — | — | 17.83 | 9.23 |
| Gaskamine ® 328 (g) | — | — | — | — |
| DETA (g) | — | — | — | — |
| TETA (g) | — | 5.17 | — | — |
| TEPA (g) | — | — | — | — |
| MXDA (g) | — | — | 0.95 | — |
| OH-802 (g) | 22.09 | 15.48 | — | — |
| Epoxide | | | | |
| Epoxide A (g) | 97.98 | 82.78 | 24.40 | — |
| Epoxide B (g) | 23.74 | — | 5.91 | — |
| Grilonit ® V34-4/5 (g) | — | — | — | 35.53 |
| CGE (g) | — | — | — | — |
| D.E.R. 331 | — | 10.35 | — | — |
| Sebacic acid (g) | — | — | — | 2.25 |
| K54 (g) | 3.75 | — | 0.93 | — |
| Water (g) | 200.75 | 150.00 | 49.98 | 51.06 |
| AHEW (g/mol) | 350.7 | 318.6 | 354.2 | 184.6 |
| Stoichiometric ratio | 4.63 | 3.59 | 6.30 | 1.90 |
| Viscosity (mPa s) | 599 | 2798 | >25,000 | 20,000 |
| Solid content (wt. %) | 50 | 50 | 50 | 55.3 |

TABLE 1-continued

| | CSE 3 | CSE 4 | CSE 5 | CSE 6 | CSE 7 |
|---|---|---|---|---|---|
| Amine | | | | | |
| DMAPA (g) | — | — | — | — | — |
| DMAPAPA (g) | — | — | — | — | — |
| Ancamine ® 2655 (g) | — | — | — | — | — |
| Benzylated amine (g) | — | — | — | — | — |
| Gaskamine ® 328 (g) | 53.98 | — | — | — | — |
| DETA (g) | — | 19.30 | 20.26 | — | — |
| TETA (g) | — | 14.85 | 15.58 | 12.34 | 18.52 |
| TEPA (g) | — | — | — | 30.07 | 45.12 |
| MXDA (g) | — | — | — | — | — |
| OH-802 (g) | 21.94 | — | — | 24.24 | 36.37 |
| Epoxide | | | | | |
| Epoxide A (g) | 97.34 | 98.52 | 103.41 | — | — |
| Epoxide B (g) | 23.59 | 23.87 | 25.06 | — | — |
| Grilonit ® V34-4/5 (g) | — | — | — | 93.32 | 140.00 |
| CGE (g) | — | 37.86 | 19.87 | — | — |
| Sebacic acid (g) | — | — | — | 5.91 | — |
| K54 (g) | 3.73 | 3.77 | 3.96 | — | — |
| Water (g) | 199.43 | 201.84 | 211.87 | 134.11 | 160.00 |
| AHEW (g/mol) | 354.1 | 355.7 | 310.0 | 187.0 | 166.2 |
| Stoichiometric ratio | — | — | — | 1.90 | 1.90 |
| Viscosity (mPa s) | Gel | 17,773 | 5,923 | 5,325 | 14,892 |
| Solid content (wt. %) | 50 | 50 | 53 | 55.3 | 60 |

Table 2 charted viscosity values for aqueous mixture of adducts of synthesis examples and comparative examples with different solid contents in weight percentage. As the sample of CSE 2 showed a significant gelling, CSE 2 was not tested for its viscosity at various solid contents. A few precipitates were observed in the CSE 4 sample with a solid content of 30 wt. %. More precipitates were observed in the CSE 4 sample with a solid content of 20 wt. %. The viscosity results of CSE 7 were tested after one week's aging.

TABLE 2

| | wt. % | | | | | | |
|---|---|---|---|---|---|---|---|
| Examples | 60% | 55.3% | 50% | 47% | 40% | 30% | 20% |
| SE 1 | n.a. | n.a. | 599 | n.a. | 316 | 101 | 18 |
| SE 2 | n.a. | n.a. | 2,798 | n.a. | n.a. | n.a. | n.a. |
| CSE 1 | n.a. | n.a. | 35,000 | n.a. | 28,900 | 3,912 | 54 |
| CSE 2 | n.a. | 20,000 | n.a. | n.a. | 3,234 | 736 | 72 |
| CSE 4 | n.a. | n.a. | 17,773 | n.a. | 10,633 | 2,199 | 140 |
| CSE 5 | n.a. | n.a. | n.a. | 5,923 | 3,465 | 1,110 | 86 |
| CSE 6 | n.a. | 5,325 | n.a. | n.a. | 1,526 | 398 | 38 |
| CSE 7 | 14,892 | n.a. | n.a. | n.a. | 2,199 | 655 | 68 |

SEs 1 and 2 showed a significantly lower viscosity under a broad spectrum of solid content (at least within the range of 20 wt. % to 50 wt. %) than comparative examples. The low viscosity would make the epoxy-amine adduct of the present disclosure suitable for various applications in which the low viscosity is desired.

Preparation and Performance of Testing Samples

Samples in testing examples (TEs) and the comparative testing example (CTEs) were prepared by formulating products (epoxy-amine adducts or mixture) obtained in the corresponding synthesis examples (SE 1 through SE 2 and CSE 1 through CSE 7) with Epon® 828 of an EEW of 185-192 g/Eq for performance test. Use level of the epoxy-amine adducts to the diluted resins are according to curing agent use level as shown as curing agent use level (phr). Epoxy-amine adducts were mixed with epoxy resin using a speed mixer. Then the coating mixtures were applied on the testing substrates and cured at 25° C. and 50% relative humidity in a climatic chamber. For TFST test, two samples of coating mixtures were deposited in climatic chambers with 10° C. and 50% relative humidity, and 25° C. and 50% relative humidity, respectively.

Drying time, glossiness, and hardness development were measured accordingly.

TABLE 3

|  | TE 1 | TE 2 | CTE 1 | CTE 2 |
|---|---|---|---|---|
| Curing agent use level (phr) | 150 | 140 | 150 | 100 |
| TFST Phase II | | | | |
| 25 C. (h) | 1.7 | 3.3 | 4.1 | 3.1 |
| 10 C. (h) | 4.3 | 4.4 | 11.5 | 2.4 |
| Surface glossiness | | | | |
| 0 min | 2.5 | 3.5 | 3.5 | 3 |
| 10 min | 2.5 | 4 | 3.5 | 3 |
| 20 min | 3 | 4 | 4 | 3 |
| 30 min | 3 | 4 | 4 | 3 |
| 60 min | 4 | 3 | 4 | N.C. |

|  | CTE 4 | CTE 5 | CTE 6 | CTE 7 |
|---|---|---|---|---|
| Curing agent use level (phr) | 150 | 150 | 100 | 85 |
| TFST Phase II | | | | |
| 25 C. (h) | 2.7 | 2.2 | 1.5 | 1.5 |
| 10 C. (h) | 9.0 | 7.0 | 4.3 | 3.8 |
| Surface glossiness | | | | |
| 0 min | 3.5 | 3.5 | 3 | 3 |
| 10 min | 3.5 | 3 | 3 | 3 |
| 20 min | 3.5 | 3 | 3 | 3 |
| 30 min | 3.5 | 2.5 | 3 | 2.5 |
| 60 min | 3 | 2 | 3 | N.C. |

N.C.: The sample was too viscous to be applied as a coating.

The surface hardness of testing examples and comparative testing examples were tested in 1 day, 3 days, and 7 days after the testing examples and comparative testing examples were prepared.

TABLE 4

| | Surface hardness development | | | | | |
|---|---|---|---|---|---|---|
| | wt. % | | | | | |
| | 1 day | | 3 days | | 7 days | |
| Examples | pencil | pendulum | pencil | pendulum | pencil | pendulum |
| TE 1 | F | 105 | H | 134 | H | 136 |
| TE 2 | H | 119 | 2H | 138 | 2H | 140 |
| CTE 1 | B | 71 | F | 106 | H | 125 |
| CTE 2 | F | 108 | H | 134 | H | 136 |
| CTE 6 | F | 126 | 2H | 144 | 2H | 143 |

From the measured TFST values, an indicator of curing process, testing example TE 1 and TE 2 had a much faster curing than any of the comparative testing examples CTE 1 through CTE 5. The thin film set time of testing example TE 1 was similar to those of comparative testing examples CTE 6 and CTE 7.

In terms of surface hardness development, another indicator of curing process, testing examples TE 1 showed a faster curing than comparative testing example CTE 1. The development of surface hardness for TE 1 is similar to those of comparative testing examples CTE 2 and CTE 6.

Regarding surface glossiness development, testing examples TE 1 showed a longer time to lose coalescence (indicator of pot life) than that of CTE 1.

Various aspects and embodiments are possible. Some of those aspects and embodiments are described herein. After reading this specification, skilled artisans will appreciate that those aspects and embodiments are only illustrative and do not limit the scope of the present disclosure. Embodiments may be in accordance with any one or more of the embodiments as listed below.

The above description is presented to enable a person skilled in the art to make and use the present disclosure and is provided in the context of an application and its requirements. Various modifications to the preferred embodiments will be apparent to those skilled in the art, and the generic principles defined herein might be applied to other embodiments and applications without departing from the spirit and scope of the present disclosure. Thus, the present disclosure is not intended to be limited to the embodiments shown but is to be accorded the widest scope consistent with the principles and features disclosed herein. In this regard, certain embodiments within the present disclosure might not show every benefit of the present disclosure, considered broadly.

The invention claimed is:

1. A waterborne epoxy curing agent comprising a reaction product of:
   a) at least one amine having at least one moiety in the formula of -QNH—, wherein Q is a divalent hydrocarbon group, and wherein the amine has at least one tertiary amino group and at least one primary amino group per molecule, wherein the amine includes one or more compounds represented by formula (II):

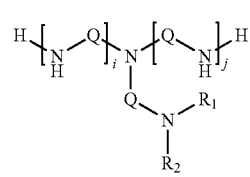

wherein i and j are independently integers not less than 1, wherein $R_1$ and $R_2$ are independently a substituted or unsubstituted C1 to C16 alkyl, alkenyl, alkadienyl, cycloalkyl, cycloalkenyl, cycloalkadienyl, aryl, or aralkyl group, and wherein Q is —$CH_2CH_2$—, —$CH_2CH_2CH_2$—, —$CH_2CH(CH_3)$—, —$CH_2CH_2CH_2CH_2$—, —$CH_2CH_2CH(CH_3)$—, —$CH_2CH(CH_3)CH_2$—, —$CH(CH_3)CH(CH_3)$—, or —$CH_2CH(CH_2CH_3)$—; and
   b) at least one polyether polyol modified epoxide having one or more epoxide groups.

2. A method for preparing a waterborne epoxy curing agent of claim 1, comprising:
   heating the reaction product to a temperature of 30° C. to 150° C. for 0.1 to 6 hours.

3. The method of claim 2, wherein a stoichiometric ratio of the amine to the epoxide is within a mole ratio of 1 to 100.

4. The waterborne epoxy curing agent of claim 1, wherein a stoichiometric ratio is in a range of 1 to 100, wherein the stoichiometric ratio is a ratio of an equivalent number in active amine hydrogen atoms of the amine to an equivalent number of epoxide groups in the polyether polyol modified epoxide.

5. The waterborne epoxy curing agent of claim 1, wherein the at least one polyether polyol modified epoxide resin comprises the reaction product of at least one epoxide compound and at least one polyether polyol.

6. The waterborne epoxy curing agent of claim 5, wherein the polyether polyol is selected from polyethylene glycol, polypropylene glycol, or polybutylene glycol.

7. The waterborne epoxy curing agent of claim 5, wherein the at least one epoxide compound is a diglycidyl ether of bisphenol A, a diglycidyl ether of bisphenol F, 1,4-butanediol diglycidyl ether, cyclohexane dimethylol diglycidyl ether, resorcinol diglycidyl ether, glycerol triglycidyl ether, trimethylol propane triglycidyl ether, or novolac epoxy resin.

8. The waterborne epoxy curing agent of claim 1 further comprising water.

9. The waterborne epoxy curing agent of claim 1, further comprising one or more catalysts.

10. The waterborne epoxy curing agent of claim 1 further comprising one or more additives selected from the group consisting of fillers, reinforcing agents, coupling agents, toughening agents, defoamers, dispersants, lubricants, colorants, marking materials, dyes, pigments, IR absorbers, UV absorbers, antistats, anti-blocking agents, nucleating agents, crystallization accelerators, crystallization delayers, conductivity additives, carbon black, graphite, carbon nanotubes, graphene, desiccants, de-molding agents, levelling auxiliaries, flame retardants, separating agents, optical lighteners, rheology additives, photochromic additives, softeners, adhesion promoters, anti-dripping agents, metallic pigments, stabilizers, metal glitters, metal coated particles, porosity inducers, glass fibers, nanoparticles, and flow assistants.

* * * * *